(12) United States Patent
He et al.

(10) Patent No.: US 8,060,358 B2
(45) Date of Patent: Nov. 15, 2011

(54) HMM ALIGNMENT FOR COMBINING TRANSLATION SYSTEMS

(75) Inventors: Xiaodong He, Issaquah, WA (US); Mei Yang, Seattle, WA (US); Jianfeng Gao, Kirkland, WA (US); Patrick Nguyen, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 685 days.

(21) Appl. No.: 12/147,807

(22) Filed: Jun. 27, 2008

(65) Prior Publication Data

US 2009/0240486 A1 Sep. 24, 2009

Related U.S. Application Data

(60) Provisional application No. 61/038,968, filed on Mar. 24, 2008.

(51) Int. Cl.
*G06F 17/28* (2006.01)
(52) U.S. Cl. .......... 704/2; 704/277; 704/9; 704/256
(58) Field of Classification Search .......... 704/1–10, 704/256, 257, 277
See application file for complete search history.

(56) References Cited

OTHER PUBLICATIONS

Bangalore, B.; Bordel, G.; Riccardi, G.; "Computing consensus translation from multiple machine translation systems"; Automatic Speech Recognition and Understanding, 2001. ASRU '01. IEEE Workshop; Publication Year: 2001, pp. 351-354.*
Ren, R.; "Dialogue machine translation system using multiple translation processors"; Database and Expert Systems Applications, 2000. Proceedings. 11th International Workshop on; Publication Year: 2000, pp. 143-152.*
S Vogel et al.; "HMM-Based Word Alignment in Statistical Translation" 1996.*

* cited by examiner

*Primary Examiner* — Huyen X. Vo
(74) *Attorney, Agent, or Firm* — Workman Nydegger

(57) ABSTRACT

A computing system configured to produce an optimized translation hypothesis of text input into the computing system. The computing system includes a plurality of translation machines. Each of the translation machines is configured to produce their own translation hypothesis from the same text. An optimization machine is connected to the plurality of translation machines. The optimization machine is configured to receive the translation hypotheses from the translation machines. The optimization machine is further configured to align, word-to-word, the hypotheses in the plurality of hypotheses by using a hidden Markov model.

18 Claims, 5 Drawing Sheets

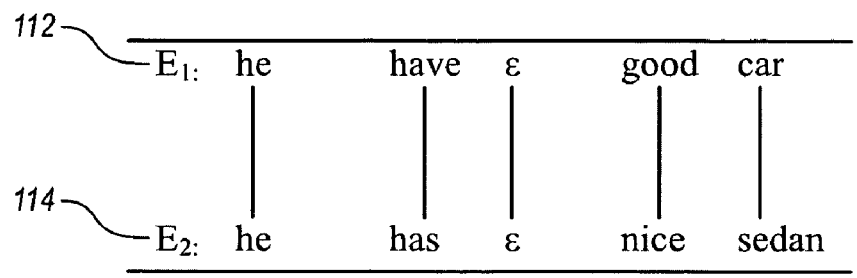
FIG. 3A
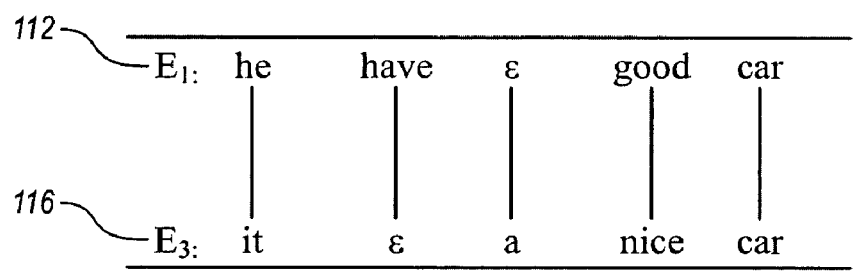
FIG. 3B
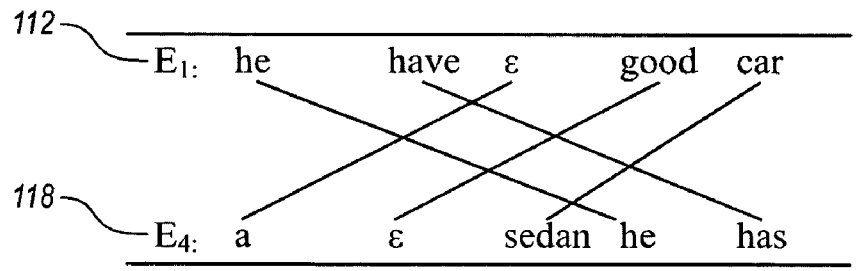
FIG. 3C
| he  | have | ε | good | car   |
|-----|------|---|------|-------|
| he  | has  | ε | nice | sedan |
| it  | ε    | a | nice | car   |
| he  | has  | a | ε    | sedan |
| $e_1$ | $e_2$ | $e_3$ | $e_4$ | $e_5$ |
FIG. 4

HMM ALIGNMENT FOR COMBINING TRANSLATION SYSTEMS

CROSS-REFERENCE TO RELATED APPLICATIONS

This application claims the benefit of U.S. Provisional application 61/038,968 filed on Mar. 24, 2008, titled "HMM ALIGNMENT FOR COMBINING TRANSLATION SYSTEM" which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc. Additionally, computers have enabled one to access data from any one of a number of far-reaching locations almost instantaneously. For example, a computer user in the United States of America can almost instantaneously access information from China, Russia, or any one of a number of other locations. Often, this information will only be available in the native language of the location where the data is retrieved from. If an individual accessing the information is not able to read the native language, the information will often be useless to that individual.

Systems have been developed to translate text from one language to another. The systems receive, as input, text (such as sentences) in one language, and using word translations, sentence translations, and probabilities emit one or more hypothesis of what an appropriate translation of the input text might be to another language.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method that may be practiced in a computing environment including a multiple system machine translation system. The method includes acts for selecting a hypothesis for a translation of an input source word sequence. The method includes, for an input source word sequence, collecting a plurality of translation hypotheses from translations from a plurality of machine translation systems. A backbone is selected from among the plurality of translation hypotheses. The hypotheses in the plurality of hypotheses are aligned word-to-word to the backbone by using a hidden Markov model. A confusion network is constructed. The confusion network includes a sequence of alternative sets. Each set includes a list of alternative words. The confusion network is decoded by selecting one word from each alternative set. The selected words are concatenated to form an optimized translation hypothesis for the input source word sequence.

Another embodiment includes a computing system configured to produce an optimized translation hypothesis of text input into the computing system. The computing system includes a plurality of translation machines. Each of the translation machines is configured to produce their own translation hypothesis from the same text. An optimization machine is connected to the plurality of translation machines. The optimization machine is configured to receive the translation hypotheses from the translation machines. The optimization machine is further configured to align, word-to-word, the hypotheses in the plurality of hypotheses by using a hidden Markov model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates an alignment process for aligning words from different hypotheses of different machine translations;

FIG. 4 illustrates selection of words for an optimized translation;

DETAILED DESCRIPTION

As noted previously, systems have been developed to translate text from one language to another. The systems receive, as input, text (such as sentences) in one language, and using word translations, sentence translations, and probabilities emit one or more hypothesis of what an appropriate translation of the input text might be to another language. It has been discovered that using multiple different systems and evaluating the hypothesis from the multiple different systems, that more accurate translations can be achieved. Thus, system combination for machine translation (MT) is an important technology. A system can be built using multiple single MT systems. For each source sentence input in to a combination MT system, the combination MT system produces a set of translation hypotheses. One of the hypotheses can be selected as the backbone. The other hypotheses are aligned to that backbone, word-to-word. A confusion network (CN) can then be constructed, and through the CN, an optimized translation output can be achieved.

Described herein are new hypothesis alignment method acts for combining multiple statistical machine translation (SMT) system outputs. In particular, a hidden Markov model (HMM) based method is illustrated for monolingual MT hypothesis word alignment. In one embodiment the HMM model parameters are derived from pre-trained bilingual word alignment models. This can be used to align multiple translation hypotheses and construct a confusion network for word level system combination.

In particular, one embodiment uses a novel HMM based alignment method. The method may use fine-grained statistical models. The method may use 1st order hidden Markov models for non-monotonic word ordering. Additionally, the method may model synonyms. For example, the method may model how likely it is that two different words have similar meanings and should be aligned to each other.

Embodiments may be implemented where it is not necessary to "train" the model. Rather, HMMs for hypothesis alignment may be derived from bilingual word alignment models. In particular, in these embodiments, no mono-lingual parallel sentence data is needed.

Some embodiments may also include the ability to normalize word alignments. For example, some processes may result in one word in one hypothesis being aligned to multiple words in a different hypothesis. Embodiments include functionality to normalize the alignment to a one to one alignment.

Figure 1:
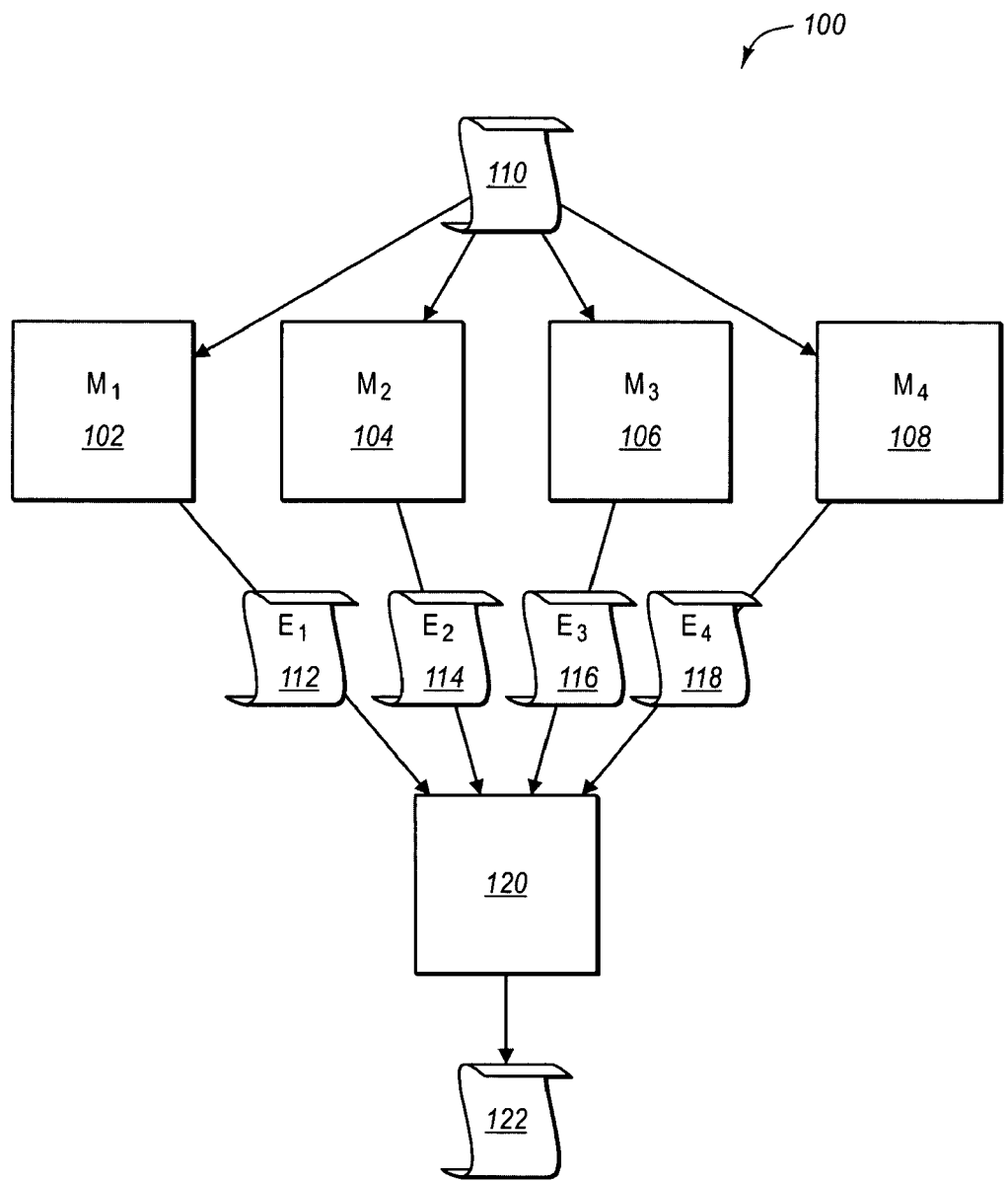
FIG. 1 illustrates an example multiple machine translation system.

More detailed examples are now illustrated. FIG. 1 illustrates a number of machines involved in a machine translation process. In particular, FIG. 1 illustrates a number of translation machines 102, 104, 106, and 108. FIG. 1 illustrates that each of the machines 102, 104, 106, and 108 receives the same text 110 as input. Each of the translation machines 102, 104, 106, and 108 also each produce their own translation hypothesis 112, 114, 116, and 118 respectively. The translation hypotheses 112, 114, 116, and 118 are the respective hypotheses for translation of the text 110.

Each of these hypotheses 112, 114, 116, and 118 are provided to an optimization machine 120. The optimization machine 120 produces an optimized hypothesis 122 using various techniques as described herein below.

Figure 2:
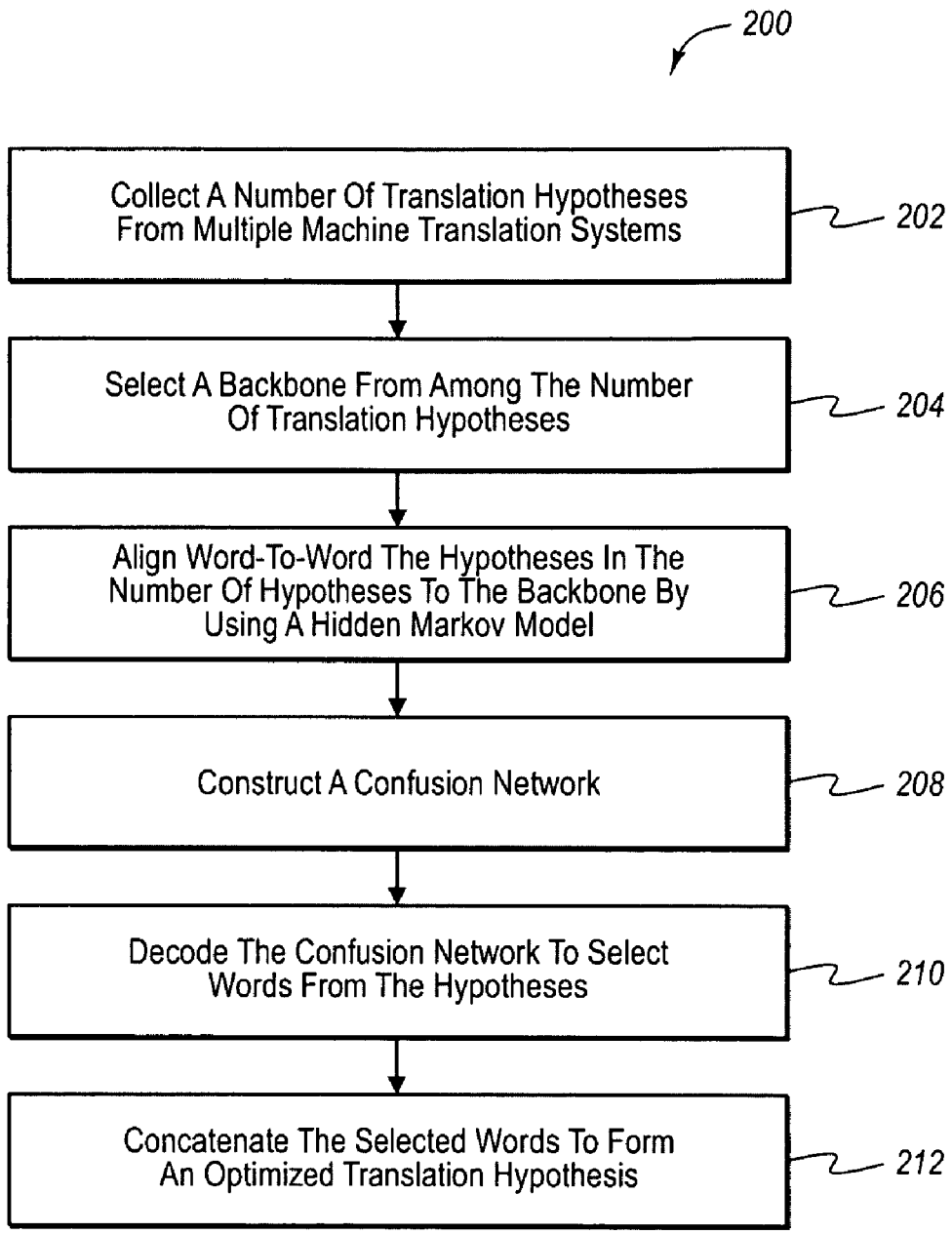
FIG. 2 illustrates a method of translating using a multiple machine translation system.

FIG. 2 illustrates one method that may be practiced to generate an optimized (but not necessarily optimal) translation hypothesis. In particular, FIG. 2 illustrates a method that may be practiced in a computing environment including a multiple system machine translation system. The method includes acts for selecting a hypothesis for a translation of an input source word sequence. For example, the method 200 may include acts for generating a hypothesis 122 for the input text 110. The method 200 includes, for an input source word sequence, collecting a number of translation hypotheses from multiple machine translation systems (act 202). Assume for this example that a source sentence in French is being translated by a multiple machine translation system into English. A source French sentence, such the text 110, results in the multiple machine translation system 100 producing a number of hypotheses, the four best being $E_1$ 112, $E_2$ 114 $E_3$ 116, and $E_4$ 118. These hypotheses may be, in the present example, as follows:

$E_1$ he have a good car
$E_2$ he has nice sedan
$E_3$ it a nice car
$E_4$ a sedan he has The method 200 further includes selecting a backbone from among the number of translation hypotheses (act 204). To select a backbone, a probabilistic analysis may be performed to select one of the hypotheses $E_1$ 112, $E_2$ 114 $E_3$ 116, or $E_4$ 118. In the present example, using the statistical analysis, the hypothesis $E_{BB}$ selected for the back bone is hypothesis $E_1$ "he have a good car".

The method 200 further includes aligning word-to-word the hypotheses in the number of hypotheses to the backbone by using a hidden Markov model (act 206). FIG. 3A illustrates alignment of hypothesis $E_2$, to the backbone $E_1$, FIG. 3B illustrates alignment of hypothesis $E_3$, to the backbone $E_1$, and FIG. 3C illustrate alignment of hypothesis $E_4$, to the backbone $E_1$. Alignment is performed using hidden Markov model based hypothesis alignment as will be discussed in more detail below.

The method 200 further includes constructing a confusion network (act 208). The confusion network includes a sequence of alternative sets, where each set includes a list of alternative words. FIG. 4 illustrates a confusion network 400 with a length L=5 for the present example. In particular, the confusion network 400 is constructed such that the sets include alternative words based on the alignment to the backbone. For example, FIG. 4 illustrates five alternative sets: $e_1$, $e_2$, $e_3$, $e_4$, and, $e_5$. Each of the alternative sets includes a word or a null from the backbone and the words or nulls from the hypotheses aligned to the word or null from the backbone.

The method 200 further includes decoding the confusion network (act 210). This may be done, in one example, by selecting one word from each alternative set. In one embodiment, voting can be performed to select the best word for each of the word sets $e_1$, $e_2$, $e_3$, $e_4$ $e_5$. For example, FIG. 4 illustrates selecting (as illustrated by the circled words) "he" from set $e_1$, "has" from set $e_2$, "a" from set $e_3$, "nice" from $e_4$, and "car" from $e_5$. Selecting functionality will be described in more detail below.

The method 200 further includes concatenating the selected words to form an optimized translation hypothesis for the input source word sequence (act 212). In the present example "he has a nice car" is selected as the optimized hypothesis, which is a concatenation of selected words from the hypotheses.

Figure 5:
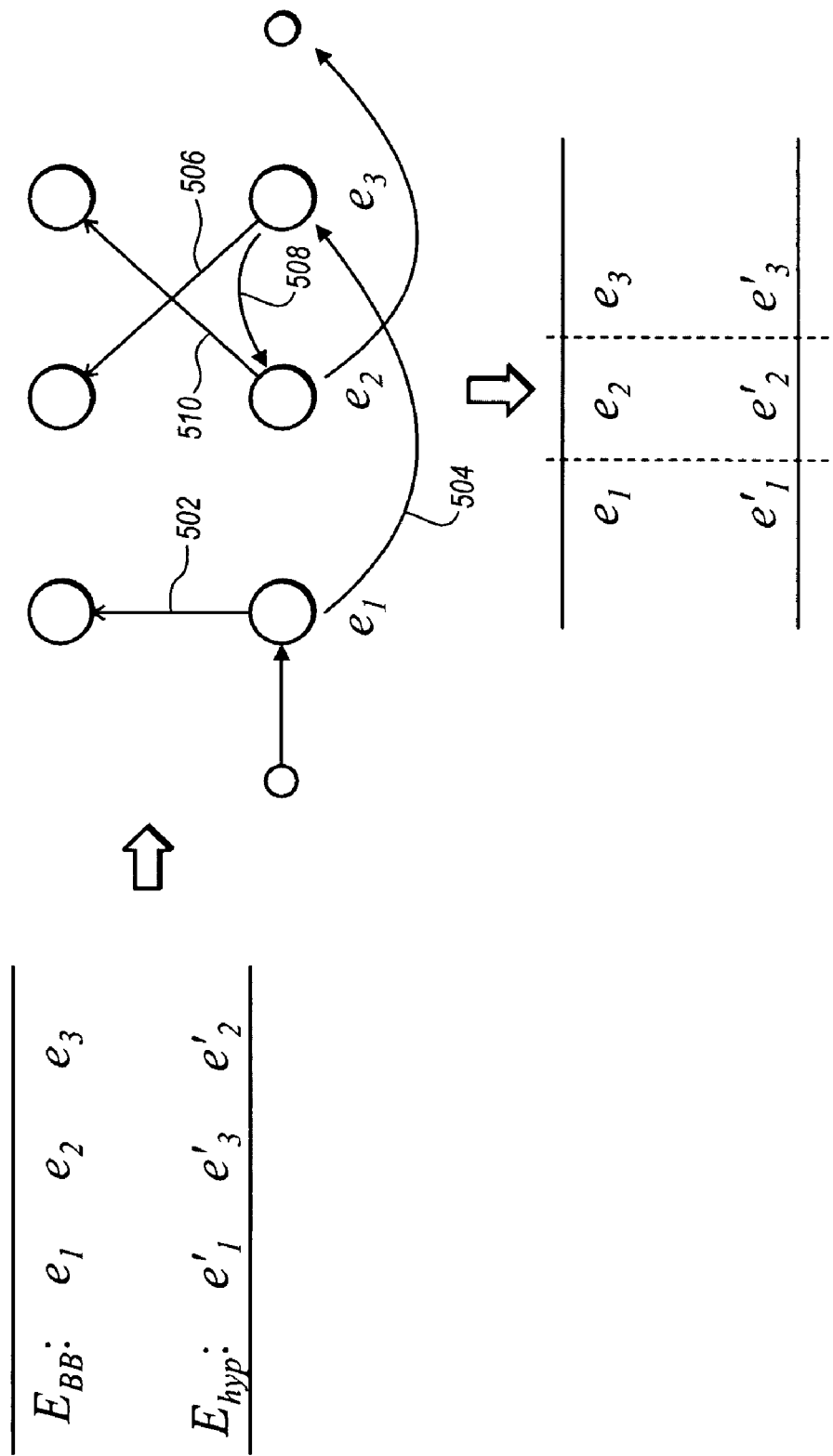
FIG. 5 illustrates a hidden Markov model based alignment.

FIG. 5 illustrates a generic hypotheses alignment using a hidden Markov model (HMM) for alignment. In particular, FIG. 5 illustrates a backbone $E_{BB}$ and a hypothesis $E_{hyp}$. The backbone includes words $e_1$, $e_2$, and $e_3$, while the hypothesis includes words $e'_1$, $e'_3$, and $e'_2$. Two probabilities are used in alignment, namely an emitting probability and a transition probability. The emitting probability relates to the probability that words from different hypothesis mean the same or a similar thing, whereas transitional probability defines the probability of ordering of words from the same hypothesis. For example, in the graph illustrated in FIG. 5, the transition 502 from $e_1$ to $e'_1$ is an example of the results of an emitting probability, while the transition 504 from $e_1$, to $e_3$ is the result of transitional probability. Similarly, the transition 506 from $e_3$ to $e'_3$ is an example of an emitting probability, while the transition 508 from $e_3$ to $e_2$ is an example of transitional probability. The transition 510 from $e_2$ to $e'_2$ is an example of emitting probability.

The present discussion will now be directed to how emitting probability, i.e. $P(e'_1|e_1)$, can be calculated. Two probability calculations can be used together or individually to provide the emitting probability for the HMM alignment described above. The first is a calculation based on the words and their expected meaning and the second is based on the surface of the words, or how similar strings of letters or portions of the words are to each other.

Figure 6:
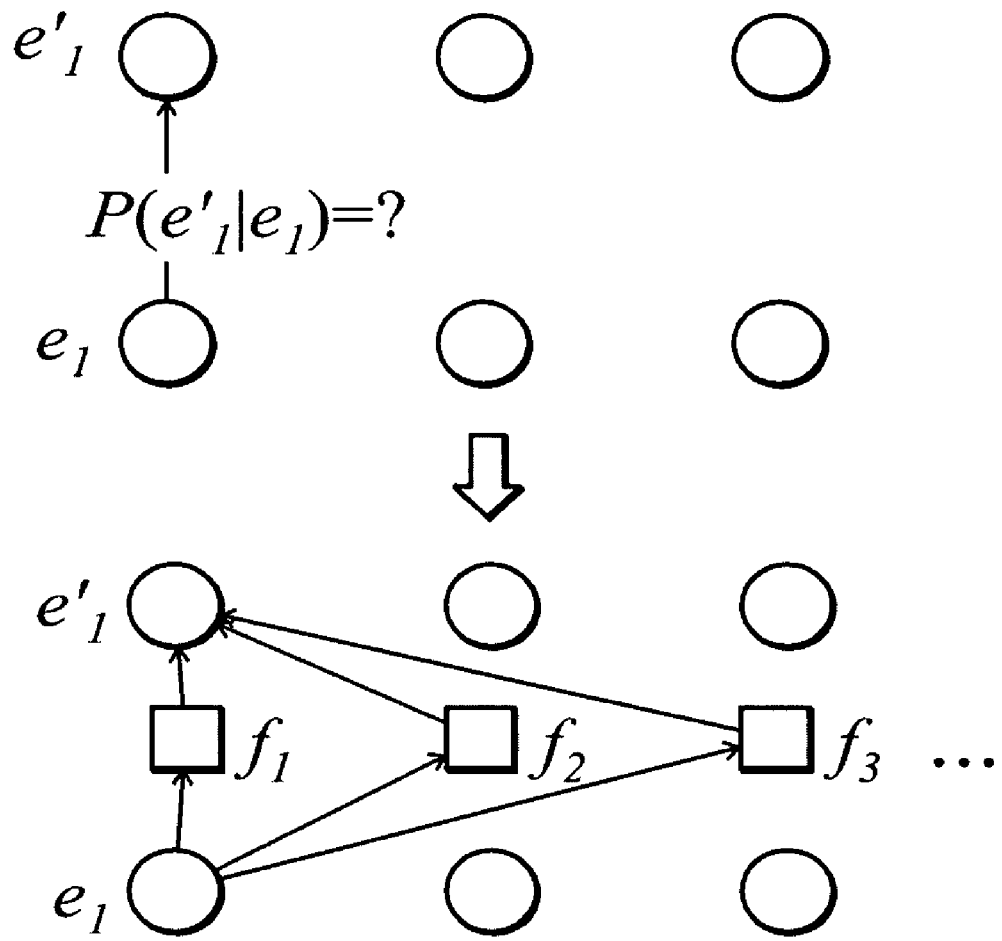
FIG. 6 illustrates use of a bridge for word alignment.

Referring now to FIG. 6, one emitting probability may be calculated based on the words and their expected meaning. This may be done using the source word sequence (e.g. the source sentence 110 (see FIG. 1) that is being translated) acting as a bridge. In particular, in the example illustrated the source sentence is a sentence in French which includes the words $f_1, \ldots, f_M$. In the example illustrated, a number of probabilities can be calculated. In particular, the probabilities that $e'_1$ is the translation for $f_1$ and that $f_1$ is the translation for $e_1$ can be calculated. Similarly as shown the probabilities that $e'_1$ is the translation for $f_2$ and that $f_2$ is the translation for $e_1$ can be calculated. The probabilities $e'_1$ is the translation for $f_3$ and that $f_3$ is the translation for $e_1$ can be calculated, and so forth. This probability can be summarized as: $P_{src}(e'_1|e_1) = \Sigma_m w_m P(e'_1|f_m)$ where $w_m = P(f_m|e_1)/\Sigma_m P(f_m|e_1)$. Additionally, $P(e'_1|f_m)$ is from the bilingual word alignment mode, F→E direction, and $P(f_m|e_1)$ is from that of E→F.

Another emitting probability based on word surface similarity can be calculated. This probability may be based on the Levenshtein distance, which includes a calculation of longest common surface distance, and/or a matched prefix length. In particular, an exponential mapping may be performed to get $P(e'_1,e_1)$. The exponential mapping includes mapping $P_{simi}(e'_1,e_1) = \exp[\rho \cdot (s(e'_1,e_1)-1)]$. $s(e'_1,e_1)$ is normalized to [0,1].

The emitting probability may include factors from both the bilingual bridging emitting probability calculation and the word surface similarity probability calculation. The following probability expression illustrates this combination:

$$P(e'_1|e_1) = \alpha \cdot P_{src}(e'_1|e_1) + (1-\alpha) \cdot P_{simi}(e'_1|e_1)$$

Transitional probability, i.e. $P(\alpha_j|\alpha_{j-1})$, for use in the hidden Markov model is also illustrated. The transitional probability models word ordering. In the following example, the transitional probability takes the same form as a bilingual word alignment HMM. Additionally, the model strongly encourages monotonic word ordering, while still allowing for non-monotonic word ordering. An example probability is illustrated by the following probability expression:

$$d(i, i') = (1 + |i - i' - 1|)^{-k} \text{ and } P(a_j | a_{j-1}) = \frac{d(a_j, a_{j-1})}{\sum_i d(i, a_{j-1})}$$

In the preceding example, the constant k may be user selected. If k is selected as 0 then there is no penalty for words in different hypothesis being far from each other. However, when k is selected as 2, there is an exponential penalty such that monotonic word ordering is strongly encouraged. Notably, such embodiments may allow for non-monotonic word ordering, but nonetheless encourage monotonic word ordering. Monotonic word ordering refers to the ordering of matched words in different hypothesis. Note that, in this method, the HMM parameters are not directly trained from a set of training corpus as is often done, rather, they are estimated through other resources, including but not limited to one or more of bilingual word alignment models, word surface similarity models, and the word ordering models.

Optimized alignment procedures may use Viterbi decoding to generate a raw alignment that can later be refined. An example of Viterbi decoding is as follows:

$$\hat{a}_1^J = \underset{a_{J1}}{\operatorname{argmax}} \prod_{j=1}^{J} [p(a_j | a_{j-1}, I) p(e'_j | e_{a_j})]$$

Other variations may be used. For example, posterior probability and threshold based decoding may be used, i.e., $\hat{\alpha} = \{\alpha_{i,j}\}$, where $\alpha_{i,j}=1$ if $p(\alpha_j=i|E,F)>$threshold, and $\alpha_{i,j}=0$ otherwise. Where $\alpha_{i,j}=1$ means $e_i$ is aligned to $f_j$. Note, in this case, it is possible lead to a N-to-M alignment, e.g., one English word can be aligned to multiple French words, and vice versa. Alternatively, maximum posterior mode decoding may be used, i.e., $\hat{\alpha}_1^J = \alpha_1, \ldots, \alpha_J$, where $$a_j = \underset{i}{\operatorname{argmax}} p(a_j = i|E, F)$$

i.e., the j-th French word is aligned to the i-th English word that gives the highest posterior probability.

The Viterbi decoding illustrated above results in 1-to-many alignments. As such, embodiments may include functionality for normalizing to a one to one alignment. This may be done by including the use of nulls inserted at appropriate places. FIG. 3 illustrates nulls as being represented by "ε". To normalize the raw alignment, a 1-to-1 alignment is needed. First, for the case that N hypothesis words are aligned to one backbone word, a winning word is chosen which gives the highest posterior probability for the alignment between it and the backbone word, where the posterior probability can be efficiently computed through the forward-backward algorithm. Other hypothesis words will be aligned to the null word that is associated to the backbone word. Note that in HMM based word alignment, each real word has an associated null word. Second, for the hypothesis words that aligned to a particular null word, at the backbone side, a set of null's are inserted around that real backbone word whom the null word associates with, and no links cross each other. That is, if there is a real hypothesis word aligned to that backbone word, for hypothesis words that are in front of that hypothesis word, corresponding null's are inserted in front of the backbone word, and null's for other hypothesis words are inserted after that backbone word. If there is no real hypothesis word aligned to that backbone word, then all nulls are inserted after that backbone word. For a backbone word that aligned to no hypothesis word, a null is inserted at the hypothesis side, just after the hypothesis word which is aligned to the immediate previous backbone word.

FIG. 4 illustrates a confusion network 400 constructed by decoding the raw alignment of the hypotheses against the backbone. In the example illustrated, S-MBR (Segmental minimum Bayes-risk decoding) can be used. The following illustrates a 0/1 local loss function that may be used:

$$e_1^* = \underset{e'_1 \in e_1}{\operatorname{argmin}} \sum_{e_1 \in e_1} L(e'_1, e_1) P(e_1 | F) = \underset{e'_1 \in e_1}{\operatorname{argmax}} P(e'_1 | F)$$

Additionally, there is a need to control the output length of the optimized hypothesis. This may be accomplished by discounting P(null|F) to balance selecting null or a real word.

Embodiments of the present invention may comprise or utilize a special purpose or general-purpose computer including computer hardware. For example, the translation machines 102-108 and the optimization machine 120 may be implemented using computing system comprising appropriate hardware and/or software including processors, memory, storage, operating systems, application software or other hardware or software. Additionally, the machines 102-108 and 120 may be implemented on each of their own separate stand-alone computer system including individualized hardware where the machines are interconnected through network communication channels or other communication channels. Alternatively, the machines 102-108 and 120 may be implemented on a common shared computer system, where the machines share resources, such as processor resources, memory resources, storage resources, or other resources.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including a multiple system machine translation system, a method of selecting a hypothesis for a translation of an input source word sequence, the method comprising:

inputting text as an input source word sequence to a plurality of the machine translation systems;

for the input source word sequence, at each machine translation system outputting a translation hypothesis and inputting each translation hypothesis to an optimization machine of the computing environment;

the optimization machine then performing each of the following:

selecting a backbone from among the plurality of translation hypotheses;

aligning word-to-word the hypotheses in the plurality of hypotheses to the backbone by using a hidden Markov model;

constructing a confusion network, the confusion network comprising a sequence of alternative sets, where each set includes a list of alternative words;

decoding the confusion network by selecting one word from each alternative set; and concatenating the selected words to form an optimized translation hypothesis for the input source word sequence.

2. The method of claim 1, wherein using a hidden Markov model comprises using an emitting probability calculated based on using a source word from the input source word sequence as a bridge between words in different hypotheses from the plurality of translation hypotheses.

3. The method of claim 1, wherein using a hidden Markov model comprises using an emitting probability calculated based on word surface similarity.

4. The method of claim 1, wherein using a hidden Markov model comprises using an emitting probability calculated based on using a source word from the input source word sequence as a bridge between words in different hypotheses from the plurality of translation hypotheses and word surface similarity.

5. The method of claim 1, wherein using a hidden Markov model comprises using a transitional probability calculated based on a model that encourages monotonic word ordering but that allows non-monotonic word ordering.

6. The method of claim 1, wherein using a hidden Markov model comprises using a transitional probability calculated based on a model that does not penalize word distance, based on selection of an appropriate selection of exponential constants in a probability expression, for words in a hypothesis as they relate to words in a backbone.

7. The method of claim 1, wherein using a hidden Markov model comprises using a transition probability calculated based on a model that encourages monotonic word ordering but that allows non-monotonic word ordering.

8. The method of claim 1, wherein aligning word-to-word the hypotheses in the plurality of hypotheses to the backbone comprises normalizing a 1-to-many alignment to a one to one alignment.

9. The method of claim 8, wherein normalizing a 1-to-many alignment to a one to one alignment comprises aligning one or more words to null.

10. The method of claim 9, wherein aligning one or more words to null comprises inserting the null around the '1' word in a 1-to-many alignment at the other side, so as to keep the relative word order.

11. The method of claim 1, wherein aligning word-to-word the hypotheses in the plurality of hypotheses to the backbone comprises using Viterbi decoding to generate a raw alignment, whereafter the raw alignment is normalized to generate a 1-to-1 word alignment between the hypotheses and the backbone.

12. The method of claim 1, wherein aligning word-to-word the hypotheses in the plurality of hypotheses to the backbone comprises using posterior probability and threshholding based decoding to generate a raw alignment.

13. The method of claim 1, wherein aligning word-to-word the hypotheses in the plurality of hypotheses to the backbone comprises using maximum posterior mode decoding to generate a raw alignment.

14. In a computing environment including a multiple system machine translation system, a computer readable medium comprising a memory storage device having computer executable instructions that when executed by a processor causes the following to be performed:
for an input source word sequence, collecting a plurality of translation hypotheses from translations from a plurality of machine translation systems;
selecting a backbone from among the plurality of translation hypotheses;
aligning word-to-word the hypotheses in the plurality of hypotheses to the backbone by using a hidden Markov model, including
using an emitting probability calculated based on using a source word from the input source word sequence as a bridge between words in different hypotheses from the plurality of translation hypotheses;
using an emitting probability calculated based on word surface similarity; and
using a transitional probability calculated based on a model that encourages monotonic word ordering but that allows non-monotonic word ordering; and
constructing a confusion network, the confusion network comprising a sequence of alternative sets, where each set includes a list of alternative words;
decoding the confusion network by selecting one word from each alternative set; and
concatenating the selected words to form an optimized translation hypothesis for the input source word sequence.

15. The method of claim 14, wherein aligning word-to-word the hypotheses in the plurality of hypotheses to the backbone comprises normalizing a 1-to-many alignment to a one to one alignment.

16. The method of claim 15, wherein normalizing a 1-to-many alignment to a one to one alignment comprises aligning one or more words to null.

17. The method of claim 16, wherein aligning one or more words to null comprises inserting the null around the '1' word in a 1-to-many alignment at the other side, so as to keep the relative word order.

18. In a computing environment including a multiple system machine translation system, a computer readable medium comprising a memory storage device having thereon computer executable instructions that when executed by a processor implement a method of selecting a hypothesis for a translation of an input source word sequence, wherein the method comprises:
inputting text as an input source word sequence to a plurality of the machine translation systems;
for the input source word sequence, at each machine translation system outputting a translation hypothesis and inputting each translation hypothesis to an optimization machine of the computing environment;
the optimization machine then performing each of the following:
selecting a backbone from among the plurality of translation hypotheses;
aligning word-to-word the hypotheses in the plurality of hypotheses to the backbone by using a hidden Markov model;
constructing a confusion network, the confusion network comprising a sequence of alternative sets, where each set includes a list of alternative words;
decoding the confusion network by selecting one word from each alternative set; and
concatenating the selected words to form an optimized translation hypothesis for the input source word sequence.

* * * * *